UNITED STATES PATENT OFFICE.

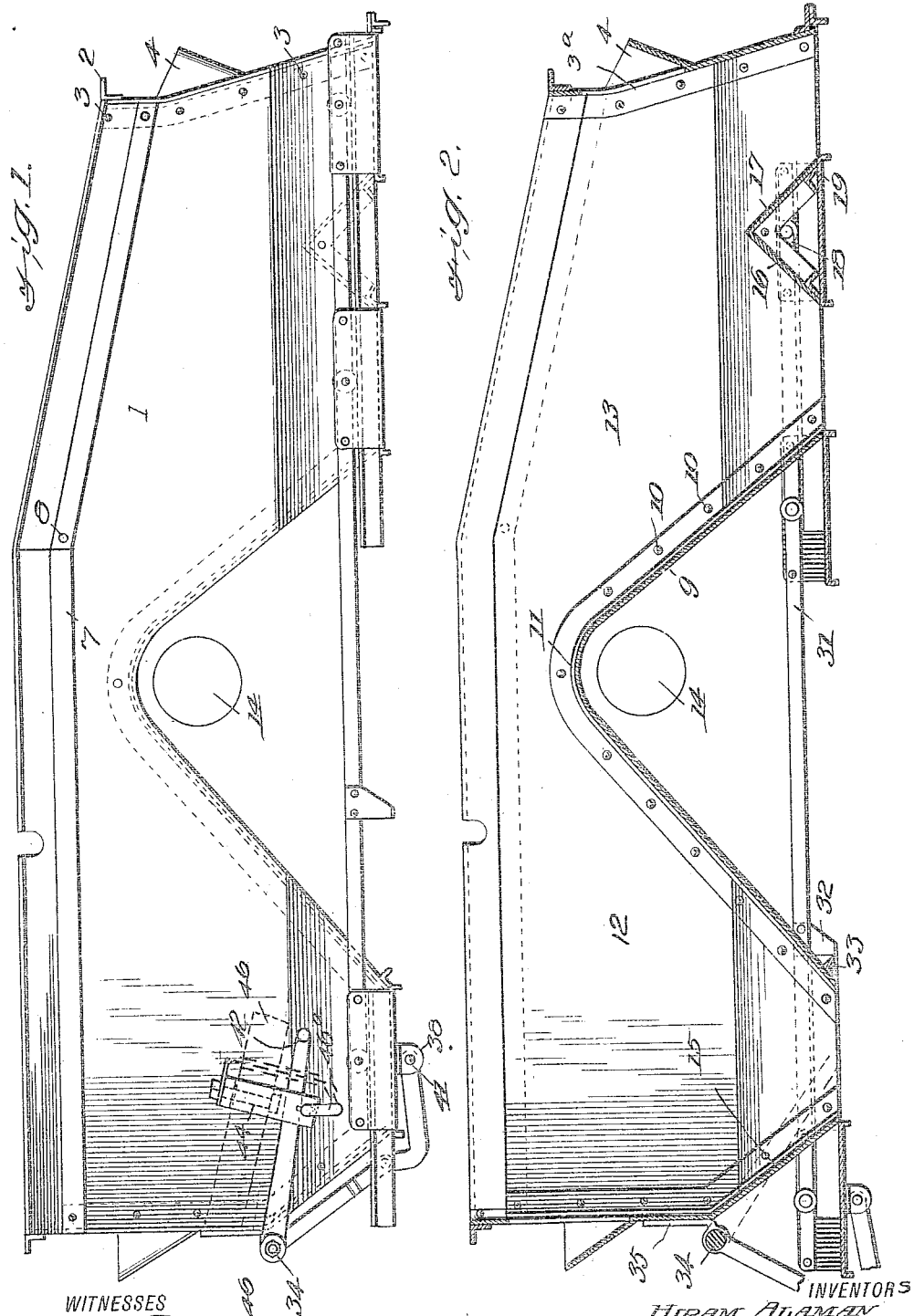

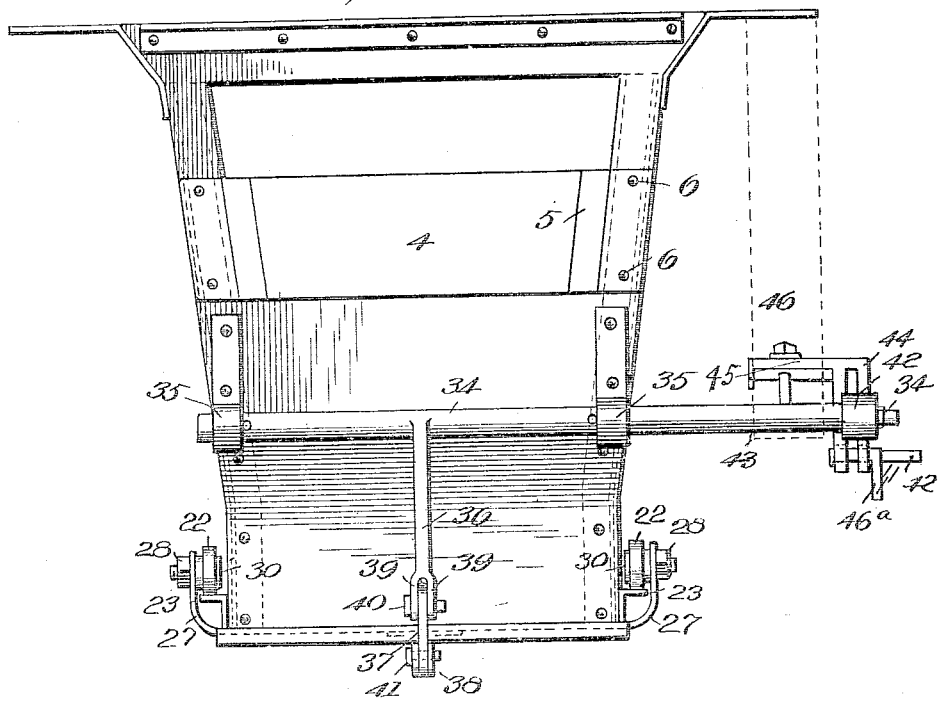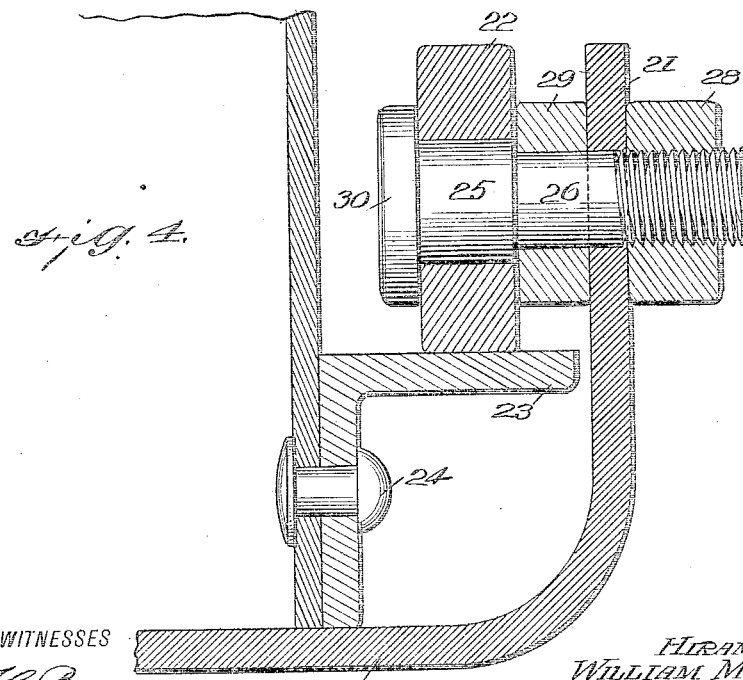

HIRAM ALAMAN AND WILLIAM McC. LINDLEY, OF TERRE HAUTE, INDIANA.

SLIDING-DOOR ASH-PAN.

953,573. Specification of Letters Patent. Patented Mar. 29, 1910.

Application filed June 25, 1909. Serial No. 504,266.

*To all whom it may concern:*

Be it known that we, HIRAM ALAMAN and WILLIAM McC. LINDLEY, citizens of the United States, and residents of Terre Haute, in the county of Vigo and State of Indiana, have made certain new and useful Improvements in Sliding-Door Ash-Pans, of which the following is a specification.

Our invention is an improvement in sliding door ash pans, and consists in certain novel constructions, and combination of parts hereinafter described and claimed.

The object of the invention is to provide an ash pan especially adapted for use with locomotives, wherein the doors are slidably mounted and movable in the same horizontal plane, and operated in unison by a common operating means.

Referring to the drawings forming a part thereof: Figure 1 is a side view of the improvement, Fig. 2 is a central, longitudinal section, Fig. 3 is an end view, and Fig. 4 is a detail sectional view of a roller and its mounting.

The present embodiment of the invention consists of a substantially hopper-shaped receptacle 1, of suitable material, preferably of sheet metal, and whose upper edge is reinforced by an angle iron 2, secured to the receptacle by rivets 3, and the parts of the receptacle are also secured in the same manner.

The ends of the receptacle are provided with openings 3ª, and plates 4 are secured below the openings, the plates extending upwardly and outwardly as shown in Figs. 1 and 2, and the ends are offset as at 5, and secured to the receptacle by rivets 6. A reinforcing bar 7 is also secured to the sides of the receptacle near the upper free edge by rivets 8.

As will be observed from an inspection of Figs. 1 and 2, somewhat over more than half of the length of the receptacle, it is of equal depth, while the remaining portion gradually diminishes in depth toward the end. At approximately its center, the receptacle is provided with a permanent bottom, consisting of a plate 9 arranged transversely of the receptacle, and whose ends are flanged, and secured to the adjacent side wall by rivets 10, and the bottom is highest at its transverse center 11, and slopes abruptly toward each end, as shown in Figs. 1 and 2, dividing the receptacle into two compartments 12 and 13.

Each of the side walls of the receptacle below the highest portion of the bottom, is provided with an opening 14 for the locomotive axle, and the end wall of the compartment 12, which is of greater depth than the compartment 13, is inclined inwardly near its bottom as at 15, while the compartment 13 is provided at approximately its center with a transverse dividing plate, consisting of two portions 16 and 17, arranged at substantially a right angle with respect to each other, the ends of the plate being flanged and secured to the adjacent side walls by rivets 18.

It will be understood that the bottom of the receptacle or ash-pan, may be provided with more or less of the dividing plates, the plate 10 also acting in this capacity, in accordance with the length thereof, and the said plates not only act as dividers, but on account of their arched form, stiffen and reinforce the side walls of the ash pan.

A door 27 is provided for each opening, each door consisting of a plate of sheet iron or other suitable material, of a size to cover and close the opening, and the ends of the door are laterally flanged as shown at 21, and each flange is provided with one or more wheels or rollers 22, which run upon a rail 23, secured to the adjacent side edge of the pan. The rail 23 is of angle iron as shown in Fig. 4, and is riveted to the side wall of the pan as at 24, and each of the rollers is journaled on the plain portion 25 of a bolt, provided with a reduced portion 26, which passes through a link 31 to be described and the flange 21 of the door, and is threaded to receive a nut 28, and the roller is limited in its lateral movement by the link, and the head 30 of the bolt.

The doors are similar in construction, and are connected together by links 31, one of which is provided with a stop-lug 32, for engaging a stop bar 33 secured to the bottom 10. Any suitable means may be provided for operating the doors, that shown comprising a rock shaft 34, journaled in bearings 35 on the end of the pan, and provided with an arm 36 to which is pivoted one end of a link 37, whose other end is pivoted between lugs 38 on the adjacent door.

The arm 36 is provided with spaced ears 39, between which is received the end of the link 37, and a bolt 40 traverses registering openings in the ears and link to secure the parts together, and the lugs 38 and the other end of the link are traversed by a similar bolt 41, for the same purpose. A crank 42 is rigid with the other end of the rock shaft, which is extended as at 43, for operating the same, and the doors are retained in closed position by the engagement of the crank with the arms of a yoke 44, on an arm 45, which is pivoted on a suitable portion 46 of the locomotive frame.

It will be evident from the description that when the shaft 34 is rotated by means of the crank, as indicated by dotted lines in Fig. 2, the doors will all be moved to the left, uncovering the respective openings, while a reverse movement will return them to their original position. A pin 46ª may be provided, which traverses alined openings in the yoke arms, for preventing accidental movement of the crank, a chain connecting the pin with the said support.

The improvement is especially adapted for use in locomotives, and the doors may be operated from the deck or from any other part of the engine, and it will be evident that it will never be necessary for any one to crawl under the locomotive in order to clean the pan.

The pan is very light, and as there are no swinging doors, accidents due to contact of such parts with the track will not occur.

The pan will not drop fire, nor will it become inoperative on account of warping due to overheating. It may also be applied to existing locomotives of all classes and designs, and the door construction may be fitted to existing pans, with but slight changes in construction.

The pan is easily applied, since there are no heavy parts to handle, and for the same reason but little addition in weight is placed on the locomotive or pan.

The improved pan does not interfere with the brake rigging, or other parts of the locomotive, such as the grates, dampers, shakers, or draft arrangements, and require no alteration in the same, and it may be manufactured at a low cost, since there are no delicate or complicated parts. It will also be observed that the edges of the openings clean the doors as they open and shut, and that the said opening and cleaning movement is positive.

It will be observed that the improved pan is provided with rails extending along the opposite outer sides of the pan and with openings in its bottom, and that the ash door extends below the pan and is provided at its opposite sides with upturned portions which extend alongside of and above the rails and that push bars are provided which extend along the inner sides of the upturned portions of the door and are secured thereto, while rollers run on the rails and are connected with the upturned portions of the door, the push bars being arranged between the rollers and the upturned portions of the door, and spacing the rollers away from the said upturned portion, whereby the rollers are set to a position relatively near to the side of the ash pan.

We claim:

1. The combination of an ash-pan having an opening in its bottom, of rails extending along the opposite outer sides of said pan, and an ash door extending below the said pan and having at its opposite sides upturned portions extending up along-side of and above the rails, push bars extending along the inner sides of said upturned portions of the door and secured thereto, rollers running on the rails and means supporting said rollers from the upturned portions of the door, the push bars extending between the rollers and the upturned portion of the door and spacing the rollers away from the upturned portions of the door whereby the rollers are set to a position relatively near the side of the ash-pan substantially as and for the purposes set forth.

2. The combination of the ash-pan proper having in its bottom a plurailty of door openings, rails secured to the outer sides of the pan, individual doors for the said openings of the pan and having at their ends upturned portions or flanges extending up along the side rails and to a point above the same, push rods extending along the inner sides of the upturned flanges of the doors at points above the rails and secured to the several doors, said push bars and door flanges having coincident openings, stud bolts fitting in said openings and provided at their inner ends with bearings, rollers mounted on said bearings and running on the rails at the sides of the pan, and means securing the stud bolts substantially as set forth.

HIRAM ALAMAN.
WILLIAM McC. LINDLEY.

Witnesses:
JOHN W. PARKS,
WILBUR C. PITMAN.